United States Patent
Yokohama et al.

(10) Patent No.: US 9,577,233 B2
(45) Date of Patent: Feb. 21, 2017

(54) BATTERY PACK AND FASTENING STRUCTURE

(71) Applicant: SANYO Electric Co., Ltd., Osaka (JP)

(72) Inventors: Tomohiko Yokohama, Osaka (JP); Shunsuke Yasui, Osaka (JP); Keisuke Naito, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/779,566

(22) PCT Filed: Mar. 7, 2014

(86) PCT No.: PCT/JP2014/001282
§ 371 (c)(1),
(2) Date: Sep. 23, 2015

(87) PCT Pub. No.: WO2014/155995
PCT Pub. Date: Oct. 2, 2014

(65) Prior Publication Data
US 2016/0056433 A1    Feb. 25, 2016

(30) Foreign Application Priority Data

Mar. 29, 2013  (JP) .................................. 2013-073043

(51) Int. Cl.
H01M 2/12    (2006.01)
H01M 2/10    (2006.01)

(52) U.S. Cl.
CPC ......... *H01M 2/1235* (2013.01); *H01M 2/1077* (2013.01); *H01M 2/1083* (2013.01); *H01M 2/1211* (2013.01); H01M 2220/20 (2013.01)

(58) Field of Classification Search
CPC  H01M 2/1235; H01M 2/1077; H01M 2/1083; H01M 2/1211; H01M 2220/20
See application file for complete search history.

(56) References Cited

U.S. PATENT DOCUMENTS

2009/0152034 A1    6/2009  Takasaki et al.
2012/0156539 A1    6/2012  Honjo et al.

FOREIGN PATENT DOCUMENTS

JP    10-138767    5/1998
JP    2001-208031    8/2001
(Continued)

OTHER PUBLICATIONS

International Search Report of PCT application No. PCT/JP2014/001282 dated Apr. 8, 2014.

*Primary Examiner* — Jane Rhee
(74) *Attorney, Agent, or Firm* — McDermott Will & Emery LLP

(57) ABSTRACT

Battery pack includes battery module, metallic installation substrate, metallic attachment member disposed between battery module and installation substrate, metallic fastening part, and insulating member for electrically insulating fastening part and attachment member, and attachment member and installation substrate, from each other, respectively. Insulating member includes annular insulating part having an inner-diameter hole allowing passing through of a male screw shaft portion of fastening part, and electrically insulating between attachment member and an entire surface of an outer periphery of the male screw shaft portion of the fastening part, and between attachment member and an entire surface of an outer periphery of the larger-diameter portion of fastening part; and plate-like insulating part having a corresponding inner-diameter hole which corresponds to the inner-diameter hole of annular insulating part and allows passing through of the male screw shaft portion of fastening part, and electrically insulating between attachment member and installation substrate.

3 Claims, 3 Drawing Sheets

(56) References Cited

FOREIGN PATENT DOCUMENTS

| | | |
|---|---|---|
| JP | 2007-042345 | 2/2007 |
| JP | 2008-130374 | 6/2008 |
| JP | 2009-143446 | 7/2009 |
| JP | 2011-241911 | 12/2011 |
| JP | 2012-129074 | 7/2012 |
| JP | 2012-129107 | 7/2012 |

BATTERY PACK AND FASTENING STRUCTURE

CROSS-REFERENCE TO RELATED APPLICATIONS

This application is a U.S. national stage application of the PCT International Application No. PCT/JP2014/001282 filed on Mar. 7, 2014, which claims the benefit of foreign priority of Japanese patent application 2013-073043 filed on Mar. 29, 2013, the contents all of which are incorporated herein by reference.

TECHNICAL FIELD

The present invention relates to a battery pack in which a battery module is fixed to an installation substrate by using an attachment member and a fastening part, and to a fastening structure.

BACKGROUND ART

In order to strongly fix two elements to each other, a metallic fastening member such as a screw and a bolt is used. At such a time, it may be necessary to secure electrical insulation between the two elements.

PTL 1 describes an insulating spacer for insulating an electronic apparatus and a metal frame from each other when the electronic apparatus is fastened and fixed to the metal frame with a metal screw. PTL 1 describes an example in which a metal frame is sandwiched between two divided insulating collars, an example in which an insulating spacer having an elastic part whose diameter is increased when a metal screw is inserted, and the like, as the prior art, and indicates that the shapes of them are larger than the outer diameter of the metal screw. Then, PTL 1 discloses an insulating spacer including a plurality of elastic thin base supports and clipping portions each of which is provided at the tip of each of the base supports. The base supports, which are apart from each other, are arranged upright from an insulating base portion. The clipping portions sandwich the shaft part of a metal screw. In any of these examples, a head part of the metal screw is exposed from an insulator.

CITATION LIST

Patent Literature

PTL 1: Japanese Patent Application Unexamined Publication No. 2001-208031

SUMMARY OF THE INVENTION

When a battery module is fixed to an installation substrate, a fixing method capable of preventing electrical short-circuit caused by a fluid conductive substance is desired.

A battery pack in accordance with the present invention includes: a battery module including a plurality of cells each having a safety valve and a duct for guiding exhaust matter, discharged from the safety valve, to outside; a metallic installation substrate on which the battery module is installed; a metallic attachment member disposed between the battery module and the installation substrate; a metallic fastening part for fastening the attachment member and the installation substrate to each other; and an insulating member for electrically insulating the fastening part and the attachment member from each other, and the attachment member and the installation substrate from each other. The fastening part is a combination body of a male screw shaft portion installed upright at the installation substrate and passing through an attachment through-hole provided in the attachment member, and a nut having a female screw hole portion that engages with the male screw shaft portion and a larger-diameter portion whose diameter is larger than an outer diameter of the male screw shaft portion, or a combination body of a female screw hole portion provided in the installation substrate, and a bolt having a male screw shaft portion, which engages with the female screw hole portion and passes through the attachment through-hole provided in the attachment member, and a larger-diameter portion whose diameter is larger than the outer diameter of the male screw shaft portion. The insulating member includes an annular insulating part including an inner-diameter hole which allows passing through of the male screw shaft portion of the fastening part, and electrically insulating between the attachment member and an entire surface of an outer periphery of the male screw shaft portion of the fastening part and between the attachment member and an entire surface of an outer periphery of the larger-diameter portion of the fastening part; and a plate-like insulating part including a corresponding inner-diameter hole which corresponds to the inner-diameter hole of the annular insulating part and allows passing through of the male screw shaft portion of the fastening part, and electrically insulating between the attachment member and the installation substrate.

A fastening structure in accordance with the present invention includes: a metallic fastening part for fastening a first metal member and a second metal member to each other; and an insulating member for electrically insulating the fastening part and the first metal member from each other, and the first metal member and the second metal member from each other. The fastening part is a combination body of a male screw shaft portion installed upright at the second metal member and passing through an attachment through-hole provided in the first metal member, and a nut having a female screw hole portion that engages with the male screw shaft portion, and a larger-diameter portion whose diameter is larger than an outer diameter of the male screw shaft portion, or a combination body of a female screw hole portion provided in the second metal member, and a bolt having a male screw shaft portion, which engages with the female screw hole portion and passes through the attachment through-hole provided in the first metal member, and a larger-diameter portion whose diameter is larger than the outer diameter of the male screw shaft portion. The insulating member includes an annular insulating part including an inner-diameter hole which allows passing through of the male screw shaft portion of the fastening part, and electrically insulating between the first metal member and an entire surface of an outer periphery of the male screw shaft portion of the fastening part, and between the first metal member and an entire surface of an outer periphery of the larger-diameter portion of the fastening part; and a plate-like insulating part including a corresponding inner-diameter hole which corresponds to the inner-diameter hole of the annular insulating part and allows passing through of the male screw shaft portion of the fastening part, and electrically insulating between the first metal member and the second metal member.

According to the above-mentioned configuration, a battery module is fixed to an installation substrate in a state in which a surrounding of a metallic fastening part is surrounded by an insulating member. Accordingly, even in the presence of a fluid conductive substance, electrical short-circuit due to the fluid conductive substance can be prevented.

DESCRIPTION OF EMBODIMENTS

Figure 1:
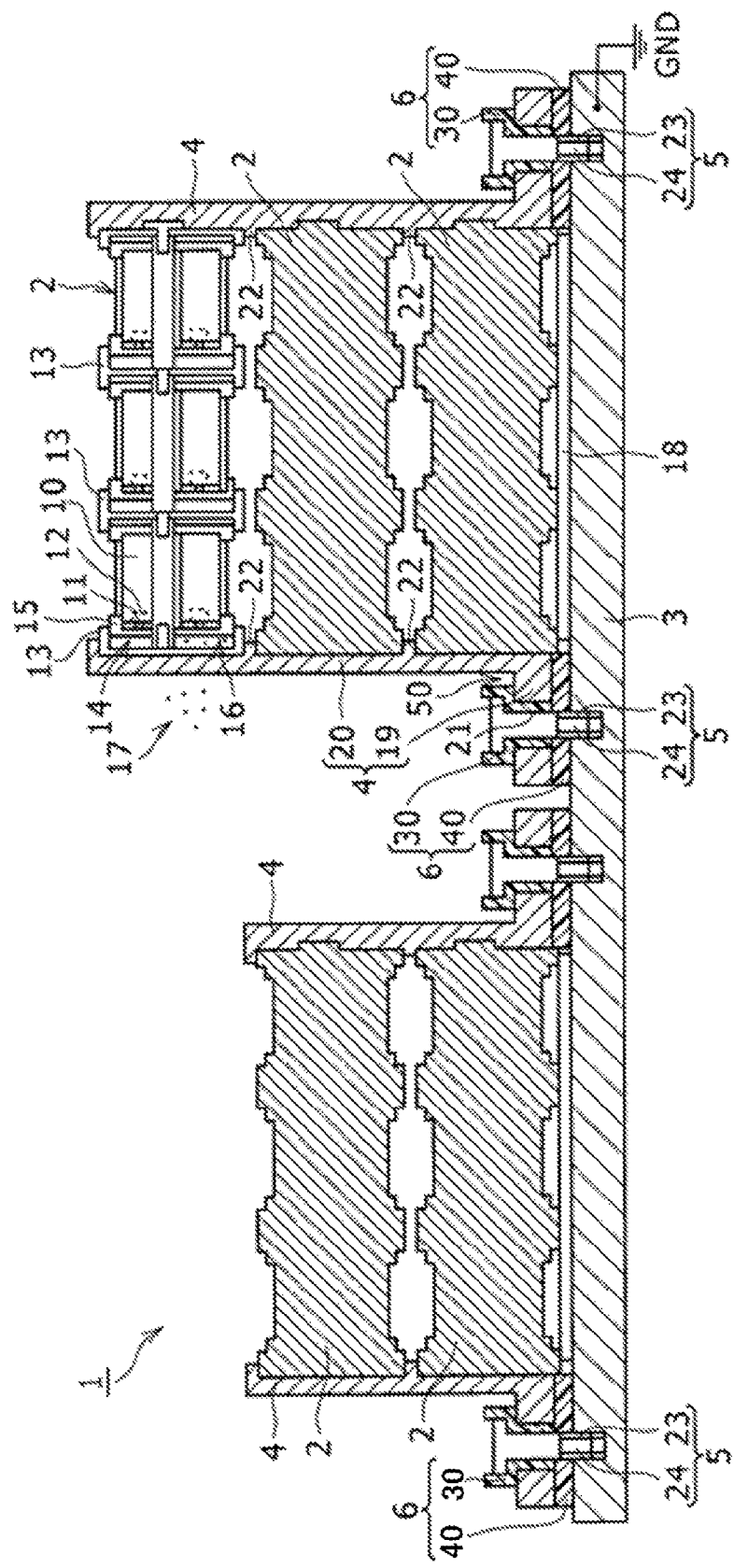
FIG. 1 is a view showing a configuration of a battery pack as an example in accordance with an exemplary embodiment of the present invention.

Hereinafter, an exemplary embodiment of the present invention is described in detail with reference to drawings. Hereinafter, as a battery pack, a high-voltage power source to be mounted on a vehicle is described. However, a battery pack may be used for applications other than a vehicle. For example, a battery pack may be used as a power source for factories, buildings, or the like. The following material, dimensions, shapes and number of cells, number of cell blocks, and the like, are mere examples and may be appropriately modified depending upon the specifications of battery modules and battery packs.

Hereinafter, the same reference numerals are given to the corresponding elements in all drawings, and repetitive description is omitted.

FIG. 1 is a sectional view showing a configuration of battery pack 1. In battery pack 1, necessary number of battery modules 2 each including a plurality of cells are aligned and fixed to installation substrate 3 via attachment member 4 by using fastening part 5. Battery pack 1 is used as a high-voltage power source to be mounted on a vehicle.

Battery module 2 is a high-voltage power source obtaining a desired high voltage by connecting a plurality of cells 10 in series. Battery pack 1 includes a plurality of battery modules 2 connected in parallel. Thus, battery pack 1 has a desired high voltage and large electric current capacity. One example of a voltage between terminals of battery module 2 is about 400 V.

In FIG. 1, battery pack 1 includes five battery modules 2. The five battery modules 2 are disposed in two parts. In a first part, three of five battery modules 2 are stacked in the height direction. In a second part, two of five battery modules 2 are stacked in the height direction.

The reason why five battery modules 2 are not disposed on a plane but stacked in the height direction in this way is because a space in battery pack 1 in which battery modules can be disposed is limited. Furthermore, five battery modules 2 are disposed in two parts having different height, including the first part composed of three battery modules 2 and the second part composed of two battery modules 2, for increasing use efficiency of the space in battery pack 1 in which battery modules can be disposed when the space in a vehicle is not a cubic shape but a complicated three-dimensional space.

In addition, each of battery modules 2 may include a plurality of cells 10 connected in parallel. In this case, battery module 2 is a large current power source having desired large current capacity. When such battery modules 2 are connected in series, a battery pack having desired high-voltage large current capacity can be obtained. Furthermore, a plurality of cells 10 is connected in series to form battery module 2, and a plurality of battery modules 2 may be connected in series to form battery pack 1. A plurality of cells 10 is connected in parallel to form battery module 2, and a plurality of the battery modules may be connected in parallel to form battery pack 1.

Each cell 10 is a chargeable-dischargeable secondary cell. As the secondary cell, a lithium ion cell is used. In addition to this, a nickel metal-hydride cell, an alkaline cell, or the like, may be used. Cell 10 has a cylindrical outer shape. One of the both ends of the cylindrical cell is used as positive electrode 11 and the other end is used as a negative electrode terminal. One example of each cell 10 is a lithium ion cell having a diameter of 18 mm, height of 65 mm, a voltage between terminals of 3.6 V, and capacity of 2.5 Ah. This is an example for description, and cell 10 may have any other shapes, dimensions, and property values. For example, cell 10 may be a rectangular cell.

Each of cells 10 includes safety valve 12. Safety valve 12 is a mechanism for releasing gas as exhaust gas from the inside of the cell to the outside when pressure of gas generated by electrochemical reaction occurring inside cell 10 exceeds a predetermined threshold pressure. Safety valve 12 is provided to each of the plurality of cells 10.

When a side having safety valve 12 is defined as a safety valve side, plurality of cells 10 are arranged in such a manner that the safety valve sides are aligned with one side along the longitudinal direction of cells 10. In FIG. 1, safety valve 12 is provided to the positive electrode 11 side of cells 10. At the one side of cells 10, duct cover 13 is provided.

Duct cover 13 is a component covering the safety valve side of battery module 2 and forming duct space 14 that allows exhaust gas to flow along the end portion at the safety valve side of battery module 2. Duct cover 13 and duct space 14 constitute a duct for guiding exhaust gas to the outside. Thus, use of duct space 14 enables the exhaust gas discharged from safety valve 12 to be discharged from a predetermined exhaust hole to the outside of battery module 2 through duct space 14 without being leaked to other places. As such a duct cover 13, a cover processed from material having predetermined heat resistance and a strength into a predetermined shape can be used.

For the material of duct cover 13, metal material is used so that duct cover 13 can endure high pressure of exhaust gas discharged from safety valve 12. Examples of the metal material include iron, aluminum, or the like. Insulating part 15 provided between duct cover 13 and cell 10 is used so as to electrically insulate between duct cover 13 of the metal material and cell 10. As insulating part 15, plastic material that has been molded into a predetermined shape can be used. Examples of the plastic material include polyethylene terephthalate, polyimide, polysulfone, polyether sulfone, polyetherimide, polyphenylene sulfide, polyether ether ketone, polycarbonate, modified polyphenylene ether, polybutylene terephthalate, and the like.

The reason why the safety valve sides are aligned with the side provided with duct cover 13 in this way is because exhaust gas is discharged to the outside of battery module 2 through duct space 14 formed by duct cover 13 when the exhaust gas is discharged from safety valve 12. In this case, since safety valve 12 is provided at positive electrode side 11 of each cell 10, positive electrode sides 11 of cells 10 are aligned with one side that is the direction in which duct cover 13 is provided. In the case of a cell provided with the safety valve at a negative electrode side, the negative electrode sides of cells 10 are aligned with the one side that is the direction in which duct cover 13 is disposed.

The exhaust gas discharged from safety valve 12 includes electrolyte mist of cell 10. The electrolyte mist is conductive fluid having fluidity. When the electrolyte mist condenses or condenses together with water in the air, the electrolyte mist becomes conductive liquid. FIG. 1 shows exhaust gas 16 including the electrolyte mist discharged from safety valve 12 to duct space 14. Furthermore, water 17 in the air is shown outside battery pack 1.

Installation substrate 3 is a metallic substrate on which a plurality of battery modules 2 is disposed. Herein, installation substrate 3 is a battery pack attachment substrate to be fixed to member material provided to a body frame of a vehicle. For such an installation substrate 3, a substrate formed by making a metal plate into a structure having a strength that resists vibration, shock, or the like, of a vehicle. Examples of the metal plate include iron material, steel material, or the like. Installation substrate 3 is connected to predetermined ground electric potential GND.

Backing plate 18 is a plate material which is disposed on the upper surface of installation substrate 3 and receives bottom surfaces of battery modules 2 disposed on the lowermost part of stacking in the height direction. Backing plate 18 can be made of appropriate insulating plate material. As the insulating plate material, molded plate material of appropriate plastic material can be used. As the plastic material, the material described for insulating part 15 can be used. Note here that battery modules 2 disposed on the lowermost part and installation substrate 3 are preferably insulated from each other. Accordingly, instead of using backing plate 18, a space may be provided for keeping battery module 2 and installation substrate 3 from each other such that they are not in contact with each other. Furthermore, installation substrate 3 may be integrated with plate-like insulating part 40 mentioned later.

Attachment member 4 is a metallic member to be disposed between battery module 2 and installation substrate 3. Attachment member 4 includes attachment part 19 having an extended surface that is parallel to the upper surface of installation substrate 3 so that attachment member 4 is attached to installation substrate 3, and module holding part 20 extending from attachment part 19 in the height direction in which battery modules 2 are stacked. Module holding part 20 holds a duct cover 13 side of battery module 2 or an opposite side to duct cover 13. Attachment part 19 and module holding part 20 extend in directions that are orthogonal to each other so as to form an L-shape.

Attachment part 19 is provided with attachment through-hole 21 through which a shaft part of fastening part 5 mentioned later is allowed to pass. Module holding part 20 is provided with support part 22. Support part 22 is provided between two battery modules 2 stacked in the height direction in order to hold the duct cover 13 side of battery module 2 and an opposite side to duct cover 13. Furthermore, if necessary, it is preferable to use a fixing screw or the like for fixing the duct cover 13 side of battery module 2 and the opposite side to duct cover 13 to module holding part 20.

As such attachment member 4, a metal plate that has been made into a structure having such a strength as to firmly hold a plurality of battery modules 2 in a state in which they are stacked onto each other in the height direction. Note here that the structure of attachment member 4 includes, in addition to an L-shape, the above-mentioned attachment through-hole 21 and support part 22. Examples of the metal plate include iron material, steel material, or the like.

Fastening part 5 fastens an attachment member and an installation substrate to each other. Fastening part 5 is formed of a combination body of female screw hole portion 23 provided in installation substrate 3 and bolt 24.

Insulating member 6 electrically insulates fastening part 5 and attachment member 4 from each other, and attachment member 4 and installation substrate 3 from each other. Insulating member 6 includes annular insulating part 30 and plate-like insulating part 40.

Figure 2:
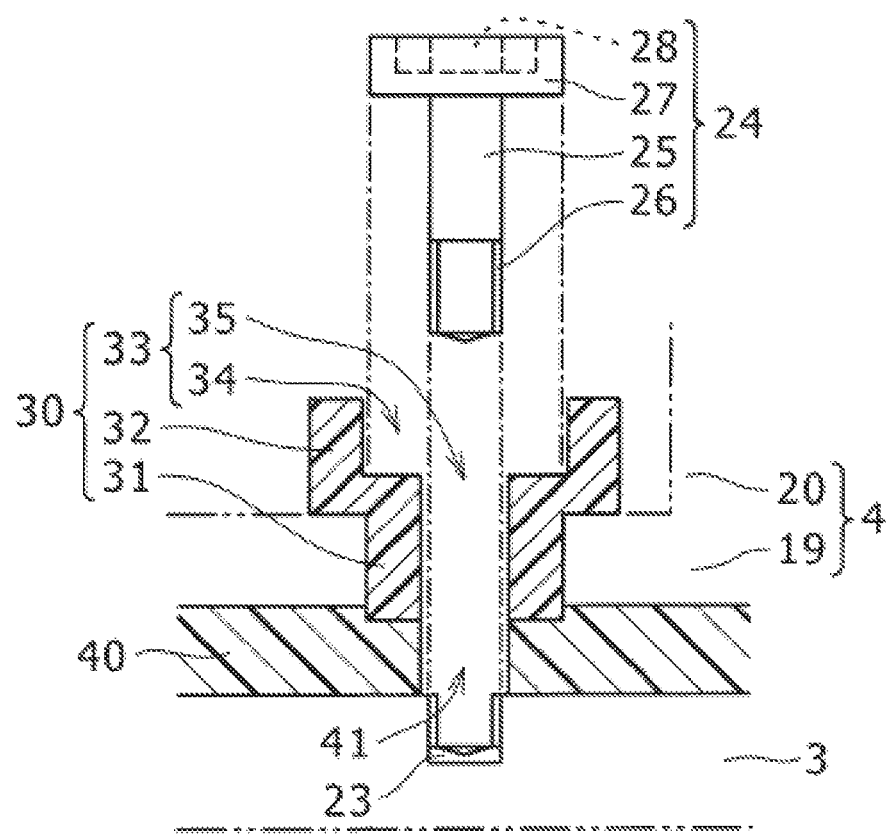
FIG. 2 is a sectional view showing a configuration of an insulating member used for the battery pack as an example in accordance with the exemplary embodiment of the present invention.
Figure 3:
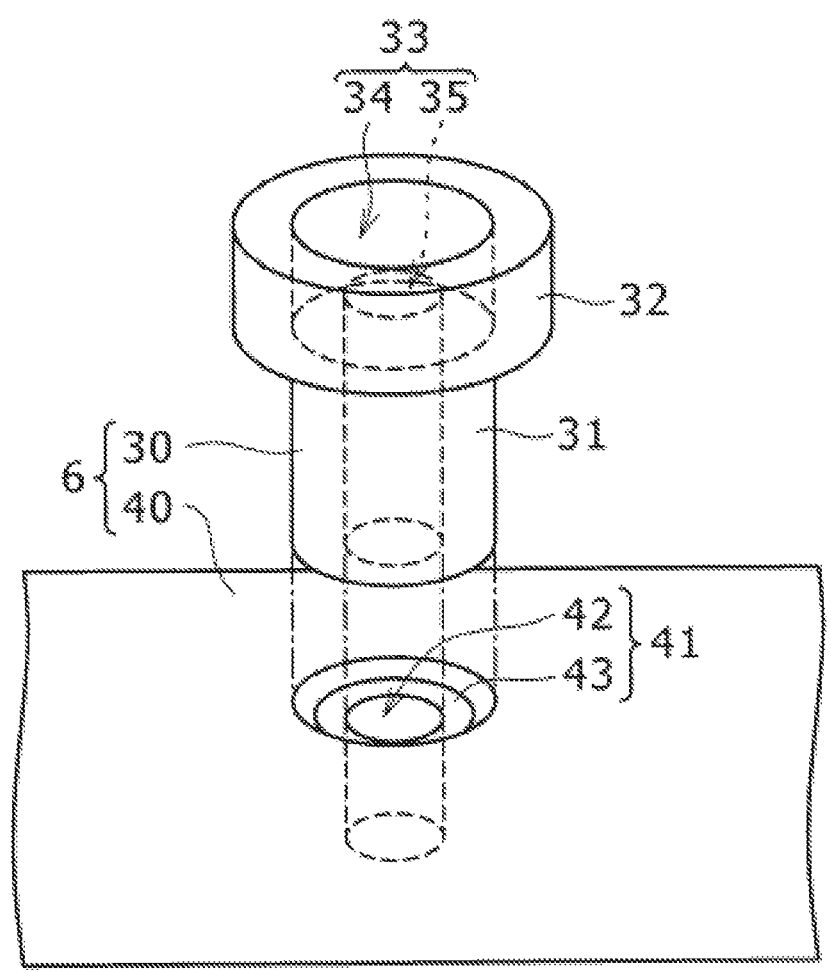
FIG. 3 is an exploded perspective view of the insulating member used for the battery pack as an example in accordance with the exemplary embodiment of the present invention.

FIG. 2 shows detail of bolt 24 and insulating member 6. FIG. 3 is an exploded perspective view of insulating member 6. Note here that in FIG. 2, installation substrate 3 and attachment part 19 of attachment member 4 are shown by an imaginary line. In installation substrate 3, female screw hole portion 23 constituting fastening part 5 is shown.

Bolt 24 is a fastening member formed of metal material in order to secure a strength necessary for fastening. Bolt 24 includes male screw shaft portion 25 that is a shaft portion passing through attachment through-hole 21 provided in attachment member 4, and larger-diameter portion 27 whose diameter is larger than the outer diameter of male screw shaft portion 25. Larger-diameter portion 27 is a head part of bolt 24 and has a disk shape. Larger-diameter portion 27 is provided with hexagonal hole 28 for tightening on the upper part thereof. Furthermore, the tip end of male screw shaft portion 25 is provided with male screw portion 26 engaging with female screw hole portion 23 of installation substrate 3.

Note here that instead of the combination body of female screw hole portion 23 and bolt 24, a combination body of a male screw shaft portion and a nut may be used. The male screw shaft portion is a shaft portion installed upright at installation substrate 3 and passing through attachment through-hole 21 provided in attachment member 4. In this case, the nut has a female screw hole portion engaging with the male screw shaft portion, and a larger-diameter portion having a larger diameter than the outer diameter of the male screw shaft portion.

Annular insulating part 30 constituting insulating member 6 includes lower cylindrical portion 31, upper cylindrical portion 32, and inner-diameter hole 33. Lower cylindrical portion 31 electrically insulates between attachment member 4 and an entire outer peripheral surface of male screw shaft portion 25 of bolt 24. Upper cylindrical portion 32 electrically insulates between attachment member 4 and an entire outer peripheral surface of larger-diameter portion 27 of bolt 24. Inner-diameter hole 33 allows male screw shaft portion 25 of bolt 24 to pass through.

A length of lower cylindrical portion 31 is set at a dimension slightly larger than a thickness dimension of attachment part 19 of attachment member 4. An outer diameter of upper cylindrical portion 32 is larger than that of lower cylindrical portion 31. Inner-diameter hole 33 is a stepped hole including upper inner-diameter hole 34 and lower inner-diameter hole 35. Upper inner-diameter hole 34 has an inner diameter accommodating larger-diameter portion 27 of bolt 24, and lower inner-diameter hole 35 has an inner diameter through which male screw shaft portion 25 of bolt 24 can pass.

Plate-like insulating part 40 constituting insulating member 6 is an insulating plate electrically insulating between attachment member 4 and installation substrate 3. Plate-like insulating part 40 includes corresponding inner-diameter hole 41 corresponding to inner-diameter hole 33 of annular insulating part 30. Corresponding inner-diameter hole 41 is a stepped hole in which upper-side larger-diameter hole 42 is a hole fitted into the outer diameter of lower cylindrical portion 31 of annular insulating part 30. A lower-side smaller-diameter hole 43 is a hole which allows male screw shaft portion 25 of bolt 24 to pass through. A step height dimension of a stepped portion of corresponding inner-diameter hole 41 is set at a dimension difference between the length of lower cylindrical portion 31 and the thickness dimension of attachment part 19 of attachment member 4.

In this way, insulating member 6 is a combination body of combination of annular insulating part 30 and plate-like insulating part 40. At this time, the stepped portion of corresponding inner-diameter hole 41 serves as positioning between annular insulating part 30 and plate-like insulating part 40. In some cases, the stepped portion of corresponding inner-diameter hole 41 may be omitted. In this case, the length dimension of lower cylindrical portion 31 of annular insulating part 30 is set at the same as or slightly smaller than the thickness dimension of attachment part 19 of attachment member 4.

Annular insulating part 30 and plate-like insulating part 40 constituting insulating member 6 can be formed of appropriate plastic material which has been make into a predetermined shape. As the plastic material, fluorocarbon resin having water-repellent property, chemical resistance, solvent resistance, or the like, can be used. In addition, material described for insulating part 15 and backing plate 18 can be used.

Battery pack 1 is assembled by the following procedure using insulating member 6. Firstly, plate-like insulating part 40 is positioned by positioning corresponding inner-diameter hole 41 of plate-like insulating part 40 to a position of female screw hole portion 23 of installation substrate 3, and plate-like insulating part 40 is disposed on the upper surface of installation substrate 3.

Next, attachment member 4 is positioned by matching attachment through-hole 21 provided in attachment part 19 of attachment member 4 with a position of corresponding inner-diameter hole 41 of plate-like insulating part 40, and attachment member 4 is disposed on the upper surface of plate-like insulating part 40. Attachment members 4 are disposed at the duct cover 13 side of battery module 2 and an opposite side to duct cover 13, respectively, such that they confront each other.

Next, lower cylindrical portion 31 of annular insulating part 30 is fitted into attachment through-hole 21 provided in attachment part 19 of attachment member 4. At this time, as described in FIG. 3, the tip end of lower cylindrical portion 31 is just fitted into a part of step difference of the stepped portion of corresponding inner-diameter hole 41 of plate-like insulating part 40. Then, bolt 24 is allowed to pass through inner-diameter hole 33 of annular insulating part 30, and corresponding inner-diameter hole 41 of plate-like insulating part 40. Then, male screw portion 26 at the tip part of bolt 24 is screwed into female screw hole portion 23 of installation substrate 3, and then temporarily tacked thereto.

Next, backing plate 18 is disposed on the upper surface of installation substrate 3 between two confronting attachment members 4. Then, battery module 2 is disposed on the upper surface of backing plate 18. This battery module 2 is a battery module disposed on the lowermost part in the batter modules stacked in the height direction.

Then, battery module 2 at the second step in the battery modules stacked in the height direction is disposed between attachment members 4 by using support parts 22 of the two confronting attachment members 4. When battery modules 2 are stacked in three steps, attachment member 4 having long module holding part 20 is used, and battery module 2 at the third step is disposed between the two attachment members by using support parts 22 for the third step. When these are disposed, an appropriate pressing means is used so that a space between the two confronting attachment members 4 is unnecessarily widened.

In this way, after a plurality of battery modules 2 is disposed between attachment members 4 by predetermined stacking in the height direction, bolt 24 is firmly screwed into female screw hole portion 23 of installation substrate 3 to be fixed. Thus, battery pack 1 is assembled.

Returning to FIG. 1 again, reservoir gap 50 is a gap space provided between attachment member 4 and a portion covering an entire surface of an outer periphery of at least the larger-diameter portion of annular insulating part 30 of annular insulating member 6. Reservoir gap 50 is capable of storing a liquid form of electrolyte mist or a liquid form of water in the air. This can prevent a conductive substance having fluidity from being brought into contact with bolt 24. As a result, it is possible to secure insulation between bolt 24 and attachment member 4, and insulation between attachment member 4 and installation substrate 3.

An effect of the above-mentioned configuration is described. As mentioned above, electrolyte mist contained in exhaust gas discharged from safety valve 12 condenses to become conductive liquid. Duct cover 13 of battery module 2 and cell 10 are electrically insulated from each other by insulating part 15. However, electrolyte mist contained in exhaust gas 16 in duct space 14 condenses and becomes a fluid conductive substance, which may cause short-circuit between positive electrode 11 of cell 10 and duct cover 13. In this case, since duct cover 13 is made of metal, and attachment member 4 at the duct cover 13 side is also made of metal, attachment member 4 at the duct cover 13 side becomes positive-electrode potential of battery module 2. On the other hand, attachment member 4 disposed opposite side to duct cover 13 holds the negative electrode side of battery module 2. Attachment member 4 for holding the negative electrode side of battery module 2 of the battery is connected to installation substrate 3, but installation substrate 3 is connected to ground potential. Therefore, the negative electrode side of battery module 2 becomes ground potential, and attachment member 4 disposed opposite side to duct cover 13 also becomes ground potential.

Herein, if insulating member 6 is not provided, metallic bolt 24 connects attachment member 4 at the metallic duct cover 13 side and metallic installation substrate 3 to each other. Accordingly, installation substrate 3 is charged to positive-electrode potential of battery module 2. On the other hand, attachment member 4 disposed at an opposite side to duct cover 13 is negative-electrode potential, that is, ground potential of battery module 2. Accordingly, in installation substrate 3, the positive-electrode potential and the negative-electrode potential in battery module 2 are short-circuited. Herein, a voltage between terminals in battery module 2 is about 400 V, and, therefore, this short-circuit is dangerous.

In the above configuration, insulating member 6 electrically insulates fastening part 5 and attachment member 4 from each other, and attachment member 4 and installation substrate 3 from each other, respectively. Accordingly, even if positive electrode 11 of cell 10 and duct cover 13 are electrically short-circuited, the positive-electrode potential and negative-electrode potential of battery module 2 are not short-circuited on installation substrate 3. Safety can be secured.

Furthermore, since reservoir gap 50 is provided, even when water in the air forms dew, water in the air becomes liquid, or electrolyte mist becomes liquid, such dew or liquid is stored in reservoir gap 50. This can prevent metallic bolt 24 and attachment member 4 from being electrically short-circuited to each other. Thus, safety can be secured.

The invention claimed is:

1. A battery pack comprising:
a battery module including a plurality of cells each having a safety valve and a duct for guiding exhaust matter, discharged from the safety valve, to outside;
a metallic installation substrate on which the battery module is installed;
a metallic attachment member disposed between the battery module and the installation substrate;
a metallic fastening part for fastening the attachment member and the installation substrate to each other, wherein the fastening part is
a combination body of
a male screw shaft portion installed upright at the installation substrate and passing through an attachment through-hole provided in the attachment member, and
a nut having a female screw hole portion that engages with the male screw shaft portion, and a larger-diameter portion whose diameter is larger than an outer diameter of the male screw shaft portion, or
a combination body of
a female screw hole portion provided in the installation substrate, and
a bolt having a male screw shaft portion, which engages with the female screw hole portion and passes through the attachment through-hole provided in the attachment member, and a larger-diameter portion whose diameter is larger than the outer diameter of the male screw shaft portion; and
an insulating member for electrically insulating the fastening part and the attachment member from each other, and the attachment member and the installation substrate from each other,
wherein the insulating member includes
an annular insulating part including an inner-diameter hole which allows passing through of the male screw shaft portion of the fastening part, and electrically insulating between the attachment member and an entire surface of an outer periphery of the male screw shaft portion of the fastening part and between the attachment member and an entire surface of an outer periphery of the larger-diameter portion of the fastening part, and
a plate-like insulating part including a corresponding inner-diameter hole which corresponds to the inner-diameter hole of the annular insulating part and allows passing through of the male screw shaft portion of the fastening part, and electrically insulating between the attachment member and the installation substrate.

2. The battery pack of claim 1, further comprising a reservoir gap capable of storing a liquid form of water in the air in the battery pack or a liquid form of water in the air, between the attachment member and a portion covering an entire surface of an outer periphery of at least the larger-diameter portion of the annular insulating part.

3. The battery pack of claim 1, wherein the attachment member is disposed between the plurality of battery modules and the installation substrate, and holds the plurality of battery modules.

* * * * *